US010517063B2

(12) United States Patent
Blaha, Jr. et al.

(10) Patent No.: US 10,517,063 B2
(45) Date of Patent: *Dec. 24, 2019

(54) ENHANCING AN ESTIMATE OF THE LOCATION OF A WIRELESS TERMINAL BY USING ONE OR MORE TYPES OF IDENTIFIERS OF A WIRELESS NETWORK

(71) Applicant: Polaris Wireless, Inc., Mountain View, CA (US)

(72) Inventors: Jerome Arthur Blaha, Jr., Redwood City, CA (US); Scot Douglas Gordon, Redmond, CA (US); Jonathan Shiao-en Lu, San Jose, CA (US); Jeffrey Noel Wu, Santa Clara, CA (US); Jian Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,359

(22) Filed: Jul. 26, 2019

(65) Prior Publication Data

US 2019/0349882 A1 Nov. 14, 2019

Related U.S. Application Data

(63) Continuation of application No. 16/047,168, filed on Jul. 27, 2018, now Pat. No. 10,412,699.
(Continued)

(51) Int. Cl.
*H04W 4/33* (2018.01)
*H04W 64/00* (2009.01)
*H04W 4/30* (2018.01)

(52) U.S. Cl.
CPC ........... *H04W 64/003* (2013.01); *H04W 4/30* (2018.02); *H04W 4/33* (2018.02)

(58) Field of Classification Search
CPC ....... H04W 64/003; H04W 4/30; H04W 4/33; H04W 4/021; G06F 16/29
See application file for complete search history.

(56) References Cited

U.S. PATENT DOCUMENTS

2014/0378166 A1 12/2014 Hong et al.
2016/0057572 A1* 2/2016 Bojorquez Alfaro ........................
H04W 4/021
455/411
(Continued)

OTHER PUBLICATIONS

"Notice of Allowance, issued in U.S. Appl. No. 16/047,168", dated May 2, 2019.

*Primary Examiner* — Chuong A Ngo
(74) *Attorney, Agent, or Firm* — McGeary Cukor LLC; Kenneth Ottesen; Jason Paul DeMont

(57) ABSTRACT

An improved technique for the estimation of the location of a wireless terminal. A disclosed location engine is capable of utilizing a service set identifier (SSID) or a media access control (MAC) address, or both, received from a reporting wireless terminal, in order to improve the estimate of the wireless terminal's location. The location engine generates a first hypothesis for the location of the wireless terminal based on evidence of the location of the wireless terminal, such signal strength measurements, wherein the evidence is independent of the SSID and MAC addresses. The location engine also generates a second hypothesis for the location based on the SSID or a third hypothesis for the location based on the MAC address, or both. An estimate of location of the wireless terminal is based on a combination of the first, second, and third hypotheses. The estimate can then be used in a location-based application.

20 Claims, 14 Drawing Sheets

Related U.S. Application Data

(60) Provisional application No. 62/653,192, filed on Apr. 5, 2018.

(56) References Cited

U.S. PATENT DOCUMENTS

| | | |
|---|---|---|
| 2018/0014161 A1 | 1/2018 | Warren et al. |
| 2018/0206105 A1* | 7/2018 | Fang ................. H04W 4/02 |

* cited by examiner

ENHANCING AN ESTIMATE OF THE LOCATION OF A WIRELESS TERMINAL BY USING ONE OR MORE TYPES OF IDENTIFIERS OF A WIRELESS NETWORK

CROSS REFERENCE TO RELATED APPLICATIONS

The following document is incorporated by reference herein: U.S. Provisional Application Ser. No. 62/653,192, filed Apr. 5, 2018. If there are any contradictions or inconsistencies in language between this application and any document that has been incorporated by reference that might affect the interpretation of the claims in this application, the claims in this application should be interpreted to be consistent with the language in this application. This application is also related to "Enhancing an Estimate of the Location of a Wireless Terminal by Using One or More Types of Identifiers of a Wireless Network," U.S. application Ser. No. 16/047,168, incorporated by reference herein.

FIELD OF THE INVENTION

The present invention relates to telecommunications in general and, more particularly, to a technique for enhancing an estimate of the location of a wireless terminal by using one or more types of identifiers of a wireless network such as a wireless local area network (WLAN).

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

SUMMARY OF THE INVENTION

In certain radio frequency (RF) propagation environments, it is unfortunately not uncommon for a first location estimation technique to report a wireless terminal as being at a first location, while a second location estimation technique concurrently reports the same wireless terminal as being at a second location. For example, in some urban RF propagation environments, a first location method utilized by a wireless terminal, such as one that is GPS-based, might report the wireless terminal as being within a first building; concurrently, a second location method based on the WiFi media access control (MAC) address seen by the wireless terminal might report the same wireless terminal as being within a second building. Therefore, a technique is needed that ameliorates or eliminates erroneous estimates of a wireless terminal's location.

The present invention enables an improved estimation of the location of a wireless terminal, over at least some techniques in the prior art. In accordance with the illustrative embodiment, a location engine disclosed herein is capable of utilizing a service set identifier (SSID) or a MAC address, or both, received from a reporting wireless terminal, in order to improve the estimate of the wireless terminal's location.

In a first scenario, the location engine receives from a wireless terminal an SSID associated with a wireless network, such as a wireless local area network (WLAN). The location engine also receives evidence of the location of the wireless terminal, wherein the evidence is independent of the SSID. The evidence can be in the form of one or more received signal strengths, for example and without limitation. The location engine transmits a search query to a web mapping service, wherein the search query contains one or more words that are based on the received SSID. Google Maps™ is a non-limiting example of a web mapping service.

The performing of an SSID-based search query is based on an insight had by the inventors that one or more words in a parsed SSID often contain important clues as to the location of the wireless terminal—at least to the extent that including the words in a search query can result in location-oriented "hits" in a response to the query. Such clues can be a name (e.g., legal business name, trade name, brand name, etc.), or portion of a name, of a business, especially a business with a known location (e.g., street address, position on a map, etc.) or locations, or a type of business or building (e.g., a gym, etc.). There are many examples of commonly-searched businesses at well-defined locations, such as hotel chains, resorts, restaurants, rental car centers, and transportation hubs, for example and without limitation.

Continuing with the first scenario, the location engine receives a response to the search query, wherein the response contains one or more locations of a business that matches the query, such as a hotel chain. The location engine generates i) a first hypothesis for the location of the wireless terminal based on the evidence of the location, ii) a second hypothesis for the location of the wireless terminal based on the received one or more locations of the business, and iii) an estimate of location of the wireless terminal based on the first hypothesis and the second hypothesis. In some embodiments of the present invention, the estimate of location consists of the second hypothesis only. The estimate of location can then be used in a location-based application.

In a second scenario, the location engine receives from a wireless terminal a first media access control (MAC) address associated with a wireless network, such as a WLAN. The location engine also receives evidence of the location of the wireless terminal, wherein the evidence is independent of the MAC address. The evidence can be in the form of one or more received signal strengths, for example and without limitation. The location engine designates at least one of a plurality of possible locations of the wireless terminal as improbable based on how closely the received first MAC address matches a second MAC address stored in a database.

The designating of possible locations as improbable (or as probable, for that matter) depending on MAC address is based on an insight had by the inventors. The insight is that the MAC addresses of WiFi devices (e.g., WiFi routers, access points, etc.) often have similar values to one another in a business facility where the WiFi infrastructure is centrally deployed and managed. This can be attributed to the fact that a business often acquires its WiFi devices in a single purchase or in a limited set of purchases. The devices that are subsequently shipped to the business are typically from the same manufacturing lot, in which the manufacturer had assigned the MAC addresses in sequential order during manufacture. Additionally, some WiFi devices each have multiple MAC addresses that are similar to each other.

Continuing with the second scenario, the location engine generates i) a first hypothesis for the location of the wireless terminal based on the evidence of the location, ii) a third hypothesis for the location of the wireless terminal based on the plurality of possible locations of the wireless terminal not designated as improbable, and iii) an estimate of location of the wireless terminal based on the first hypothesis and the third hypothesis. In some embodiments of the present invention, the estimate of location consists of the third hypothesis only. The estimate of location can then be used in a location-based application.

In some embodiments of the present invention, the first hypothesis can be regarded as an initial hypothesis and each of the second and third hypotheses from the aforementioned scenarios can be regarded as an alternative hypothesis. This is particularly applicable in operational scenarios in which evidence of the location of the wireless terminal has conventionally been used to generate an estimate of location and, as an enhancement or a verification, an estimate of location based on SSID and/or MAC address is introduced. In generating an estimate of location, each hypothesis can be weighted according to any of a number of factors, including a predetermined accuracy of the second or third hypothesis in relation to that of the first hypothesis, given the local RF propagation environment.

In some embodiments of the present invention, location engine 113 can base the estimate of location on multiple sets of hypotheses across multiple times (t[1], t[2], t[3], etc.) within a given time interval. Location engine 113 can do so by determining which combination of hypotheses (e.g., first and second hypotheses, first and third hypotheses, etc.) is the most self-consistent during the entire time interval. The self-consistency of a given combination of hypotheses can be measured in terms of the range, variance, and/or standard deviation of the estimates of location across the multiple times for that combination of hypotheses.

An illustrative method of estimating the location of a wireless terminal comprises: receiving, by a data-processing system: i) a service set identifier (SSID) associated with a wireless network and reported by the wireless terminal, and ii) evidence of the location of the wireless terminal, wherein the evidence is independent of the wireless network; transmitting, by the data-processing system, a search query to a web mapping service, wherein the search query contains one or more words that are based on the SSID; receiving, by the data-processing system, a response to the search query, wherein the response contains at least one location of one or more organizations that match the query; generating, by the data-processing system, a first hypothesis for the location of the wireless terminal based on the evidence of the location; generating, by the data-processing system, a second hypothesis for the location of the wireless terminal based on the at least one location of the one or more organizations; and generating, by the data-processing system, an estimate of location of the wireless terminal based on the first hypothesis and the second hypothesis, wherein each of the first and second hypotheses has non-zero weight.

Another illustrative method of estimating the location of a wireless terminal comprises: receiving, by a data-processing system: i) a first media access control (MAC) address associated with a wireless network and reported by the wireless terminal, and ii) evidence of the location of the wireless terminal, wherein the evidence is independent of the wireless network; designating at least one of a plurality of possible locations of the wireless terminal as improbable based on: i) the number of digits in the first MAC address whose values match those of corresponding digits in a second MAC address stored in a database; generating, by the data-processing system, a first hypothesis for the location of the wireless terminal based on the evidence of the location; and generating, by the data-processing system, a second hypothesis for the location of the wireless terminal based on the plurality of possible locations of the wireless terminal not designated as improbable; and generating, by the data-processing system, an estimate of location of the wireless terminal based on the first hypothesis and the second hypothesis, wherein each of the first and second hypotheses has non-zero weight.

Yet another illustrative method of estimating the location of a wireless terminal comprises: receiving, by a data-processing system: i) a service set identifier (SSID) associated with a wireless network and reported by the wireless terminal, ii) a first media access control (MAC) address-associated with the wireless network and reported by the wireless terminal, and iii) evidence of the location of the wireless terminal; parsing the SSID, resulting in a first parsed SSID of one or more words; designating at least one of a plurality of possible locations of the wireless terminal as improbable based on: i) the number of words in the first parsed SSID that match those of a second parsed SSID stored in a database, and ii) the number of digits in the first MAC address whose values match those of corresponding digits in a second MAC address stored in the database; generating, by the data-processing system, a first hypothesis for the location of the wireless terminal based on the evidence of the location; and generating, by the data-processing system, a second hypothesis for the location of the wireless terminal based on the plurality of possible locations of the wireless terminal not designated as improbable; and generating, by the data-processing system, an estimate of location of the wireless terminal based on the first hypothesis and the second hypothesis, wherein each of the first and second hypotheses has non-zero weight.

DEFINITIONS

Figure 1:
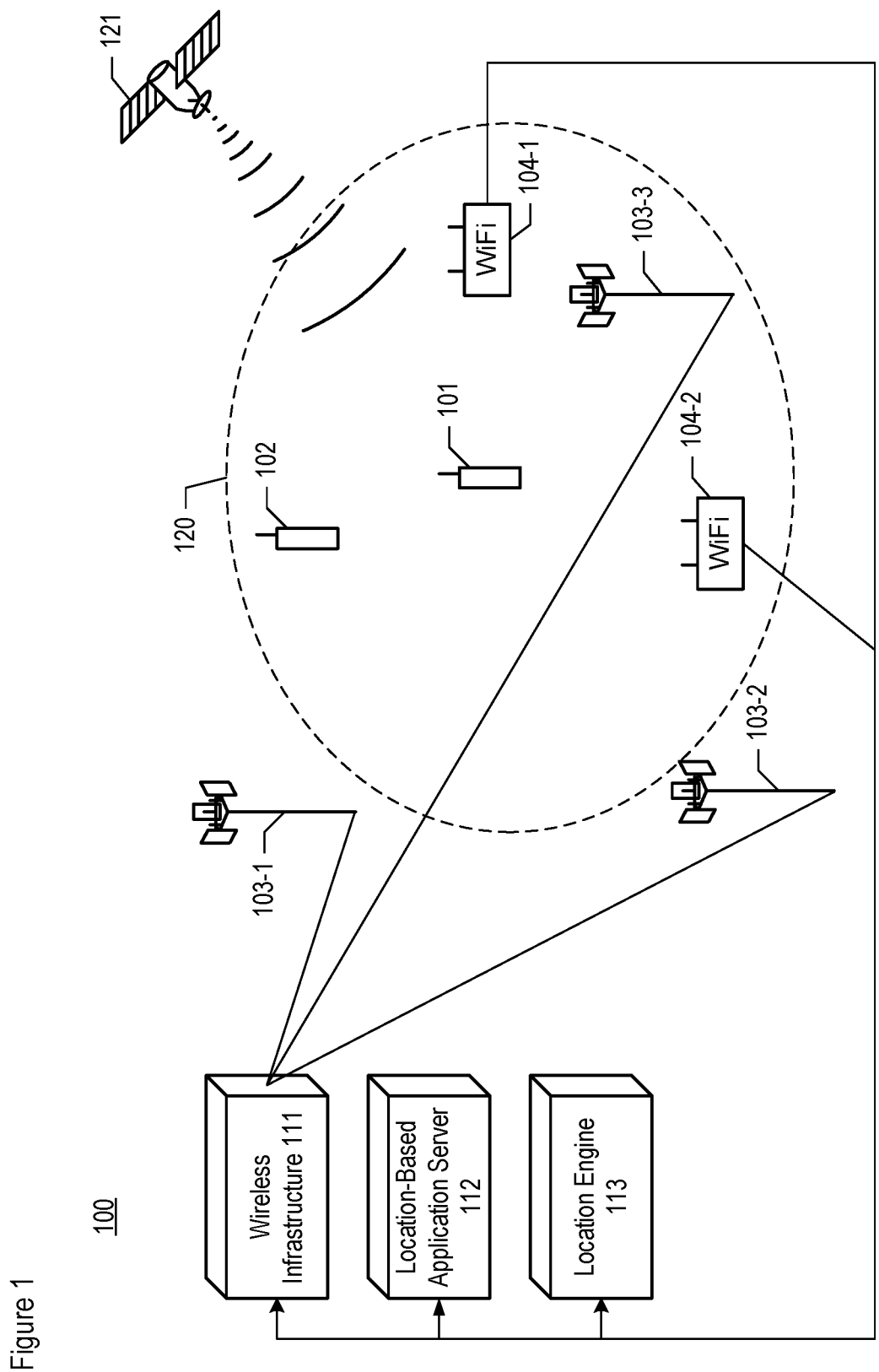
FIG. 1 depicts a diagram of the salient components of wireless telecommunications system 100 in accordance with the illustrative embodiment of the present invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the phrase "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:
  (i) a measurement of a location-dependent trait (e.g., signal strength, etc.) of a radio signal as received by the wireless terminal,
  (ii) the identity of a radio signal as received by the wireless terminal (e.g., in a service environment in which different radio signals transmitted from different locations are assigned different identities, etc.), or
  (iii) the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.
For example and without limitation, the amplitude and phase of a radio signal are generally location-dependent traits of the signal. In contrast, the frequency of a given radio signal is generally not a location-dependent trait of the signal.

Location-Trait Database—For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Wireless Telecommunications System 100—FIG. 1 depicts a diagram of the salient components of wireless telecommunications system 100 in accordance with the illustrative embodiment of the present invention. Wireless telecommunications system 100 comprises: wireless terminals 101 and 102, cellular base stations 103-1, 103-2, and 103-3, Wi-Fi base stations 104-1 and 104-2, wireless infrastructure 111, location-based application server 112, location engine 113, and Global Positioning System (GPS) constellation 121, interrelated as shown.

Wireless infrastructure 111, location-based application server 112, location engine 113 (hereinafter "location engine 113"), and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminals 101 and 102 are devices that provide bi-directional voice, data, and video telecommunications services to their respective users (not shown). Terminals 101 and 102 also perform the processes described below and in the accompanying figures, including reporting of the service set identifier (SSID), media access control (MAC) address, and possibly other identifiers in a wireless network (e.g., wireless local area network [WLAN], etc.) that is being accessed by the wireless terminals within system 100. Terminals 101 and 102 comprise the hardware and software necessary to do the aforementioned tasks. Furthermore, wireless terminals 101 and 102 are mobile and can be at any location within geographic region 120 at any time.

Wireless terminals 101 and 102 provide the aforementioned telecommunications services to their respective users and perform the aforementioned tasks. It will, however, be clear to those skilled in the art, after reading this disclosure, how to make and use embodiments of the present invention in which wireless terminals 101 and 102 provide a different set of services or perform a different set of tasks.

In accordance with the illustrative embodiment, wireless terminals 101 and 102 can receive one or more radio signals from each of base stations 103-1, 103-2, and 103-3, Wi-Fi base stations 104-1 and 104-2, and GPS constellation 121, in well-known fashion. Wireless terminals 101 and 102 are also capable of identifying each radio signal it receives, in well-known fashion, and of transmitting the identity of each signal it receives to location engine 113. Both wireless terminals are further capable of measuring one or more location-dependent traits of each radio signal they receive, in well-known fashion, and of transmitting each measurement they generate to location engine 113. Both wireless terminals also can measure a difference of a location-dependent trait of two signals they each receive, in well-known fashion, and of transmitting such measurements to location engine 113. As those who are skilled in the art will appreciate after reading this specification, wireless terminals 101 and 102 can use technologies other than WiFi and GPS for location purposes in some other embodiments of the present invention.

In accordance with the illustrative embodiment, wireless terminals 101 and 102 can transmit one or more radio signals—that can be received by one or more of base stations 103-1, 103-2, and 103-3 and Wi-Fi base stations 104-1 and 104-2—in accordance with specific parameters (e.g., signal strength, frequency, coding, modulation, etc.), in well-known fashion, and of transmitting those parameters to location engine 113.

In accordance with the illustrative embodiment, and as described in detail below, wireless terminals 101 and 102 each comprise a barometer (shown in FIG. 2 as barometer 205). Accordingly, wireless terminals 101 and 102 are capable of measuring (e.g., periodically, sporadically, and on-demand) the barometric pressure, in well-known fashion, and of transmitting the measurements to location engine 113. As those who are skilled in the art will appreciate after reading this specification, at least some embodiments of the present invention can be made and used without a barometer being present at one or more of the wireless terminals.

Although the illustrative embodiment depicts wireless telecommunications system 100 as comprising two wireless terminals, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline and with wireless terminals 101 and 102 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and to perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminals 101 and 102, and b. identifying each radio signal transmitted by wireless terminals 101 and 102, in well-known fashion, and of transmitting the identity of those signals to location engine 113, and c. measuring one or more location-dependent traits of each radio signal transmitted by wireless terminals 101 and 102, in well-known fashion, and of transmitting the measurements to location engine 113, and d. transmitting one or more signals to wireless terminals 101 and 102 in accordance with specific parameters (e.g., signal strength, frequency, coding, modulation, etc.), in well-known fashion, and of transmitting those parameters to location engine 113, and e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminals 101 and 102 via radio in well-known fashion and in accordance with a WiFi protocol. As is well known to those skilled in the art, base stations are also commonly referred to by a variety of alternative names such as access points, nodes, network interfaces, etc. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

a. receiving one or more radio signals transmitted by wireless terminals 101 and 102, and b. identifying each radio signal transmitted by wireless terminals 101 and 102, in well-known fashion, and of transmitting the identity of those signals to location engine 113, and c. measuring one or more location-dependent traits of each radio signal transmitted by wireless terminals 101 and 102, in well-known fashion, and of transmitting the measurements to location engine 113, and d. transmitting one or more signals to wireless terminals 101 and 102 in accordance with specific parameters (e.g., signal strength, frequency, coding, modulation, etc.), in well-known fashion, and of transmitting those parameters to location engine 113, and e. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminals 101 and 102 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminals 101 and 102—generated by location engine 113—in a location-based application, in well-known fashion. Location-based applications are well-known in the art and provide services such as, and without limitation, E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the locations of wireless terminals 101 and 102 as described below and in the accompanying figures. In accordance with the illustrative embodiment, location engine 113 is implemented on a data-processing system made up of one or more server computers. Location engine 113 comprises the location-trait database and geographic information system (GIS) databases, which are described in detail below. Location engine 113 is capable of accessing the Internet.

Figure 3:
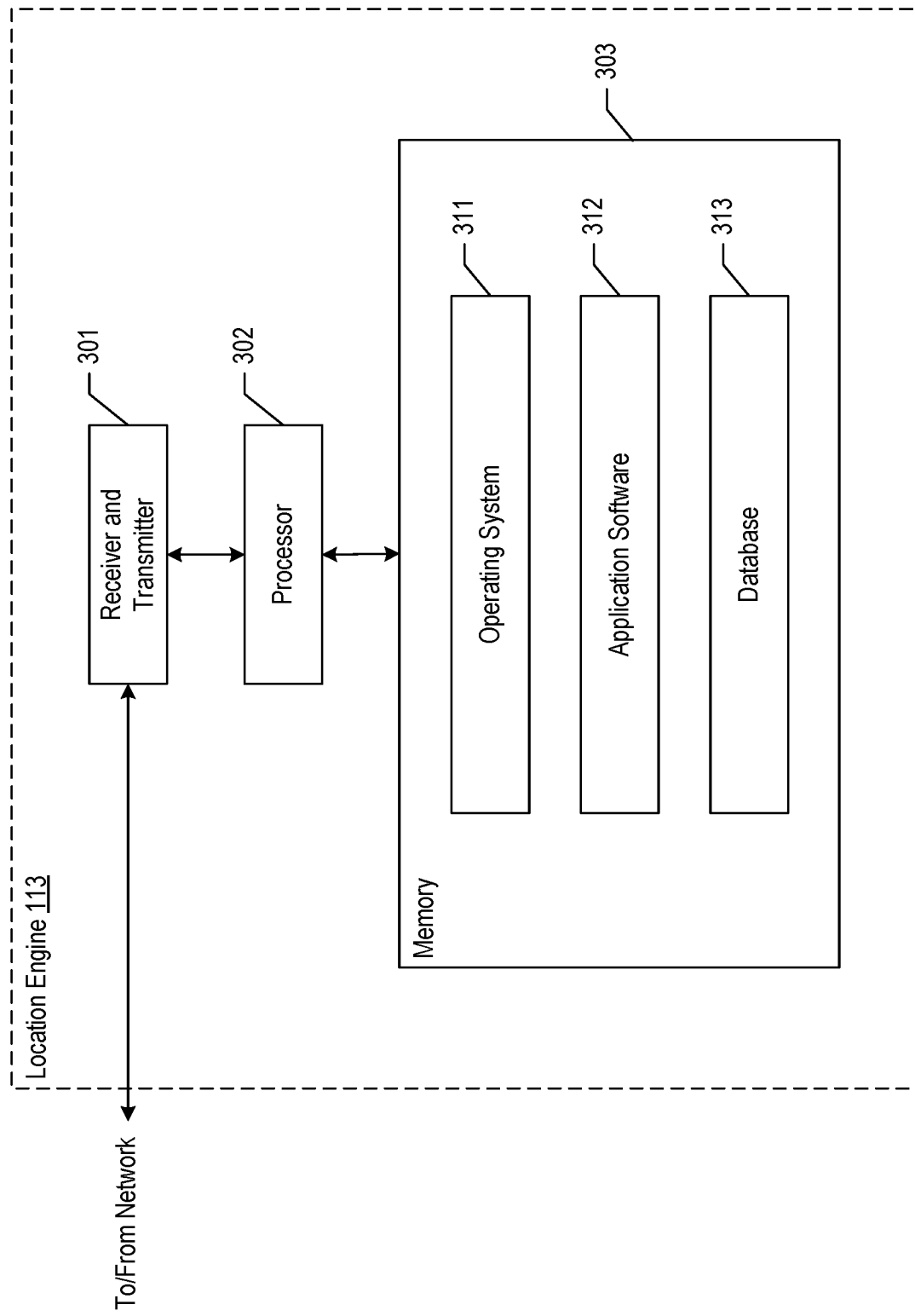
FIG. 3 depicts a block diagram of the salient components of location engine 113 of telecommunications system 100.

It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

Figure 2:
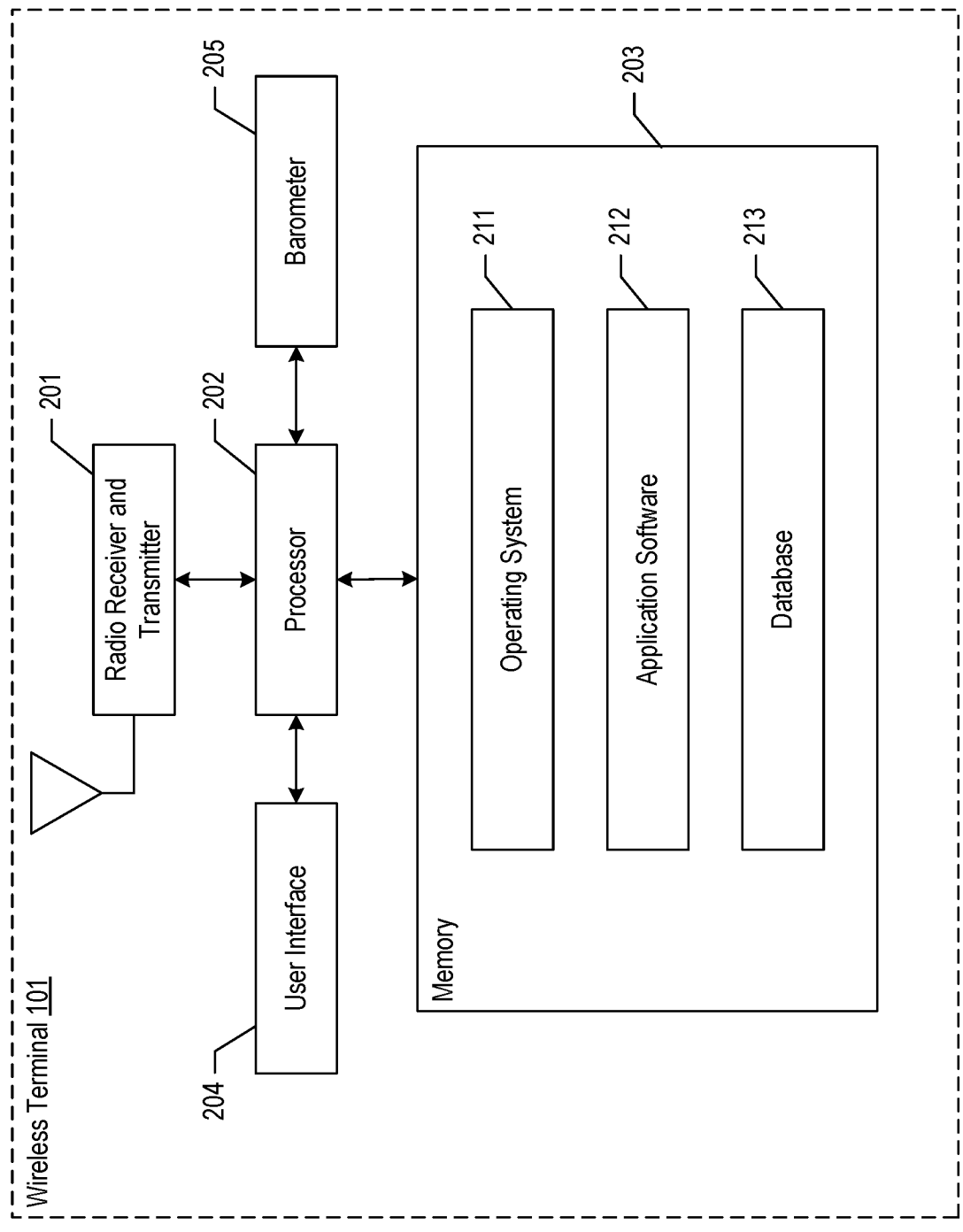
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, user interface 204, and barometer 205, interconnected as shown. The block diagram depicted in FIG. 2 can also be considered representative of wireless terminal 102 and other wireless terminals.

Radio receiver and transmitter 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

User interface 204 is hardware and software that enables a person to interact with wireless terminal 101. User interface 204 comprises a display, keypad, microphone, and speaker. It will be clear to those skilled in the art how to make and use user interface 204.

Barometer 205 is a barometric sensor device and comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

As those who are skilled in the art will appreciate, wireless terminal 101 can be equipped with one or more sensors that can measure temperature of and/or humidity in the environment. For example, the Bosch BMP280 chip is also capable of measuring temperature.

Wireless terminal 101 can perform at least some of the processes described below and in the accompanying figures. For example and without limitation, wireless terminal 101 is capable of:

a. receiving one or more radio signals transmitted by cellular base stations 103-1, 103-2, and 103-3, Wi-Fi base stations 104-1 and 104-2, and GPS constellation 121, and
b. identifying each radio signal transmitted by cellular base stations 103-1, 103-2, and 103-3, Wi-Fi base stations 104-1 and 104-2, and GPS constellation 121, in well-known fashion, and of transmitting the identity of those signals to location engine 113, and
c. measuring one or more location-dependent traits of each radio signal transmitted by cellular base stations 103-1, 103-2, and 103-3, Wi-Fi base stations 104-1 and 104-2, and GPS constellation 121, in well-known fashion, and of transmitting the measurements to location engine 113, and
d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113.

It will be clear to those skilled in the art how to make and use wireless terminal 101 and, by extension, wireless terminal 102.

Location engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter 301 enables location engine 113 to transmit to and receive from wireless terminals 101 and 102, wireless infrastructure 111, location-based application server 112, Wi-Fi base stations 104-1 and 104-2, and the Internet, in well-known fashion. It will be clear to those skilled in the art how to make and use receiver and transmitter 301.

Processor 302 is a general-purpose processor that can execute an operating system, the application software that performs operations 401 through 415 (described herein and shown in FIG. 4), and of populating, amending, using, and managing a location-trait database and a GIS database, as described in detail below and in the accompanying figures. It will be clear to those skilled in the art how to make and use processor 302.

In general, the location-trait database contains information for the possible locations of a wireless terminal and the identity and location-dependent traits of radio signals as if the wireless terminal were at each of those locations. It will be clear to those skilled in the art how to make and use the location-trait database.

In general, the GIS database contains information for geographic region 120, including without limitation, the physical characteristics of all of the structures in geographic region 120. It will be clear to those skilled in the art how to make and use the GIS database.

Memory 303 is a non-transitory, non-volatile memory that stores:
a. operating system 311, and
b. application software 312, and
c. the location-trait database in database 313, and
d. the GIS database in database 313.

It will be clear to those skilled in the art how to make and use memory 303.

Figure 4:
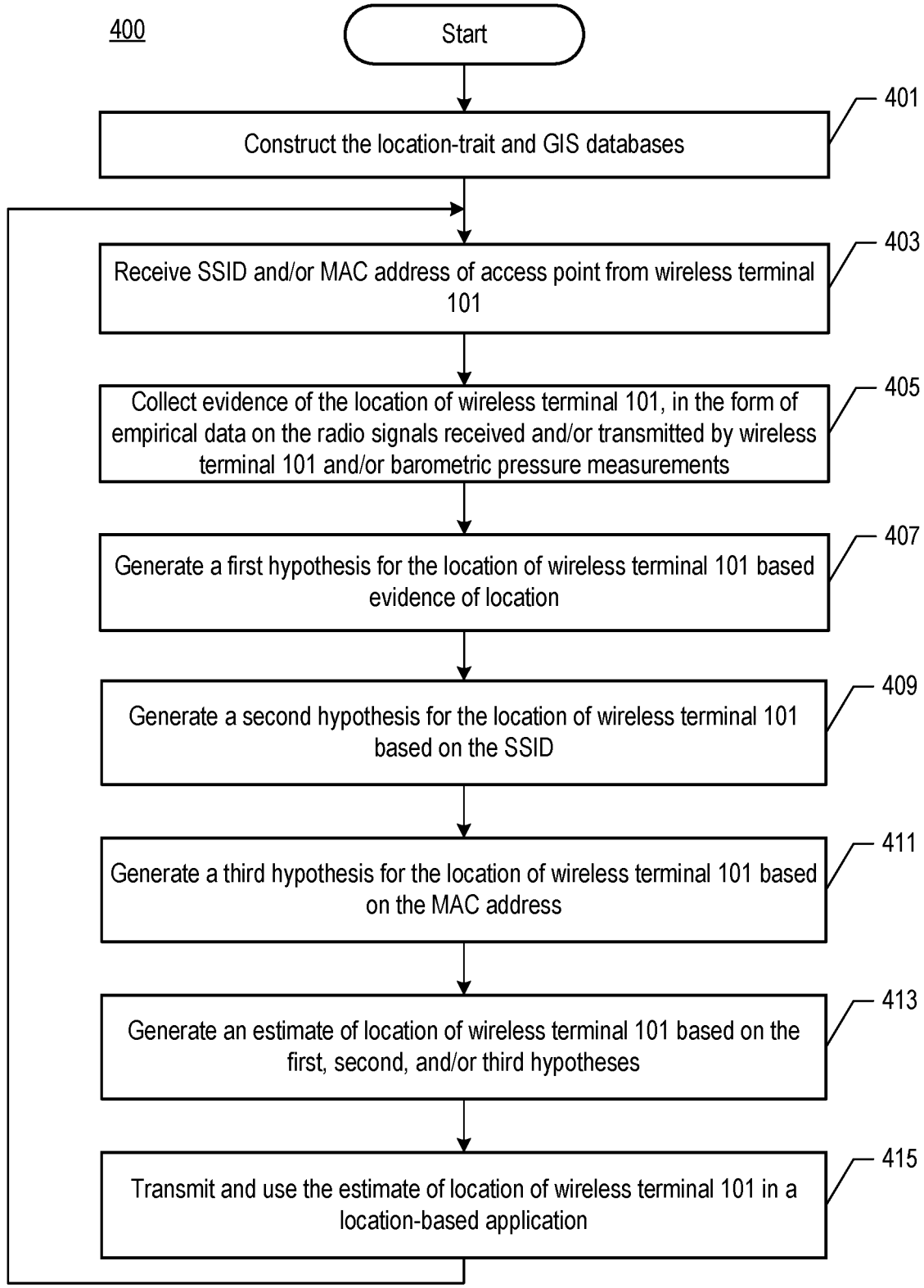
FIG. 4 depicts a flowchart of the salient processes performed as part of method 400 in accordance with the illustrative embodiment of the present invention.

Operation of the Illustrative Embodiment—FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, terminal 102, etc.).

In accordance with operation 401, the location-trait database and the GIS database are constructed and stored in memory 303 of location engine 113. Operation 401 is described in detail below and in the accompanying figures.

In accordance with operation 403, location engine 113 receives one or more service set identifiers (SSID) or media access control (MAC) addresses, or both, from wireless terminals 101 and 102. The SSID is associated with (e.g., is the name of, identifies, etc.) a wireless network that is providing service to the wireless terminal that is reporting the SSID, in which one or more base stations that enable the WLAN transmit the SSID. A non-limiting example of such a wireless network is the wireless local area network (WLAN) enabled by base stations 104-1 and 104-2. The MAC address is that of a base station (e.g., [WiFi] access point, etc.) that is enabling the wireless network, such as base station 104-1 or 104-2. As those who are skilled in the art will appreciate after reading this specification, other types of identifiers can be used instead of, or in addition to, an SSID or a MAC address, for the purpose of performing the operations described herein.

In accordance with operation 405, location engine 113 collects evidence of the location of wireless terminal 101, in the form of empirical data on the radio signals received and transmitted by wireless terminals 101 and 102 and/or measurements of barometric pressure made by wireless terminals 101 and 102. Operation 405 is described in detail below and in the accompanying figures. In accordance with the illustrative embodiment, the evidence of the location of wireless terminal 101 is independent of the wireless network with which the received SSID and/or the MAC address are associated. For example and without limitation, that the received evidence is independent can signify that (i) the evidence originates from a signal source that is itself independent of a wireless local area network (WLAN) and/or equipment (e.g., access points, etc.) that are being represented by or that are transmitting the SSID and/or MAC address, or (ii) the evidence is uncorrelated with the WLAN, or (iii) the evidence is obtained independently of the SSID and/or the MAC address.

As those who are skilled in the art will appreciate after reading this specification, location engine 113 can collect other forms of evidence of location for the purposes of performing the operations described herein, such as measurements of temperature, humidity, sound, and light, for example and without limitation.

In accordance with operation 407, location engine 113 generates a first hypothesis for the location of wireless terminal 101 based on the evidence of location received. Operation 407 is described in detail below and in the accompanying figures.

In accordance with operation 409, location engine 113 generates a second hypothesis for the location of wireless terminal 101 based on the SSID received. Operation 409 is described in detail below and in the accompanying figures.

In accordance with operation 411, location engine 113 generates a third hypothesis for the location of wireless terminal 101 based on the MAC address received. Operation 411 is described in detail below and in the accompanying figures.

In accordance with operation 413, location engine 113 generates an estimate of the location of wireless terminal 101 based on:
  (i) the first hypothesis for the location of wireless terminal 101 generated in accordance with operation 407,
  (ii) the second hypothesis for the location of wireless terminal 101 generated in accordance with operation 409,
  (iii) the third hypothesis for the location of wireless terminal 101 generated in accordance with operation 422.

Operation 413 is described in detail below and in the accompanying figures.

In accordance with operation 415, location engine 113 transmits the estimate of the location of wireless terminal 101 generated in accordance with operation 413 to location-based application server 112 and/or to wireless terminal 101 and/or 102 for use in a location-based application. In some embodiments of the present invention, location engine 113 transmits one or more of the first, second, and third hypotheses. In some embodiments of the present invention, location engine 113 displays (e.g., on a display, etc.) the estimate of location and/or one or more of the hypotheses of location, instead of or in addition to transmitting them. It will be clear to those skilled in the art how to make and use embodiments of the present invention that perform operation 415.

After operation 415 is completed, control passes back to operation 403.

Figure 5:
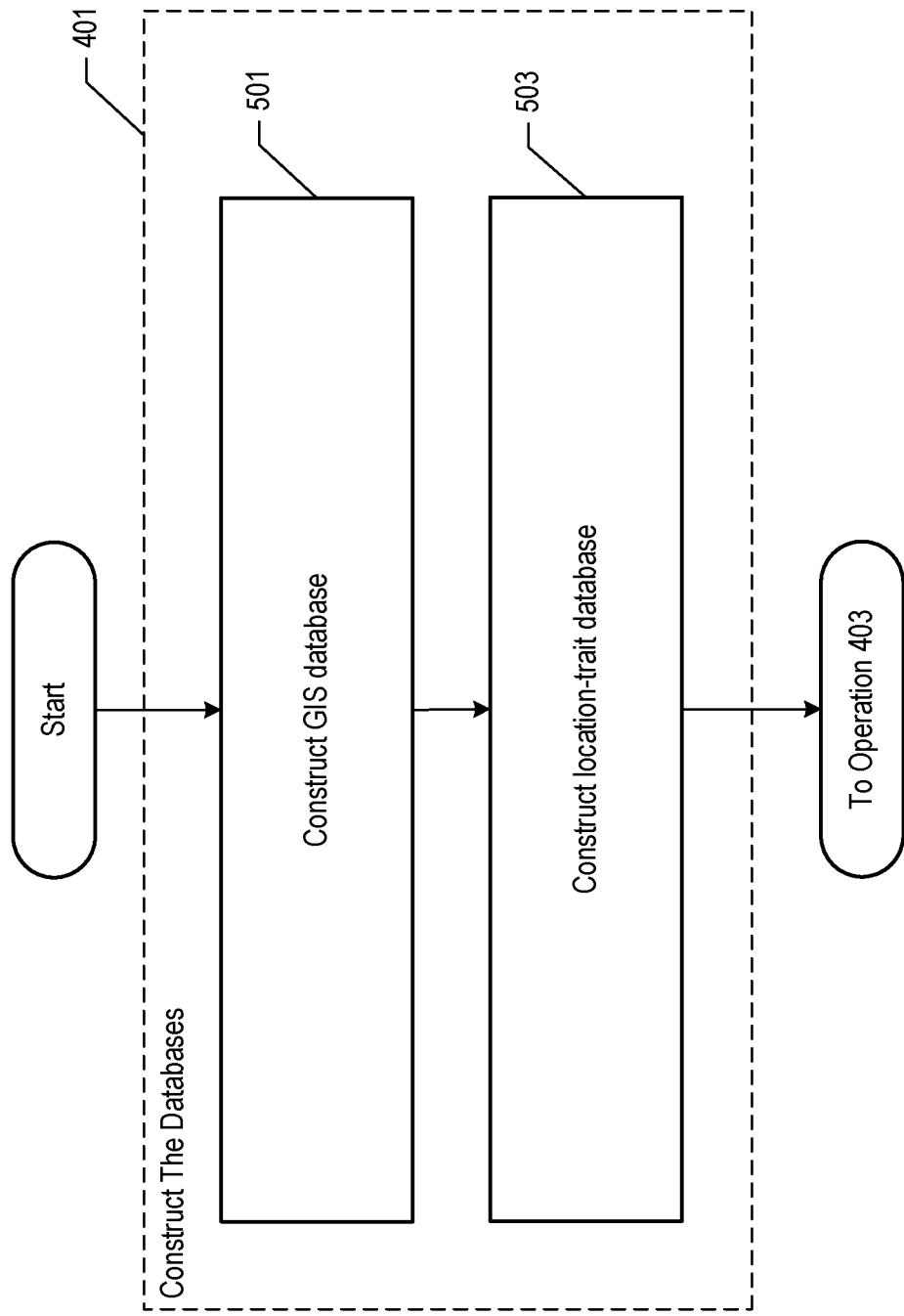
FIG. 5 depicts a flowchart of the salient processes performed in accordance with operation 401 of method 400.

Operation 401: Construct the GIS Database and the Location-Trait Database—FIG. 5 depicts a flowchart of the salient processes performed in accordance with operation 401.

At operation 501, the GIS database is constructed and stored in memory 303 of location engine 113.

Figure 6:
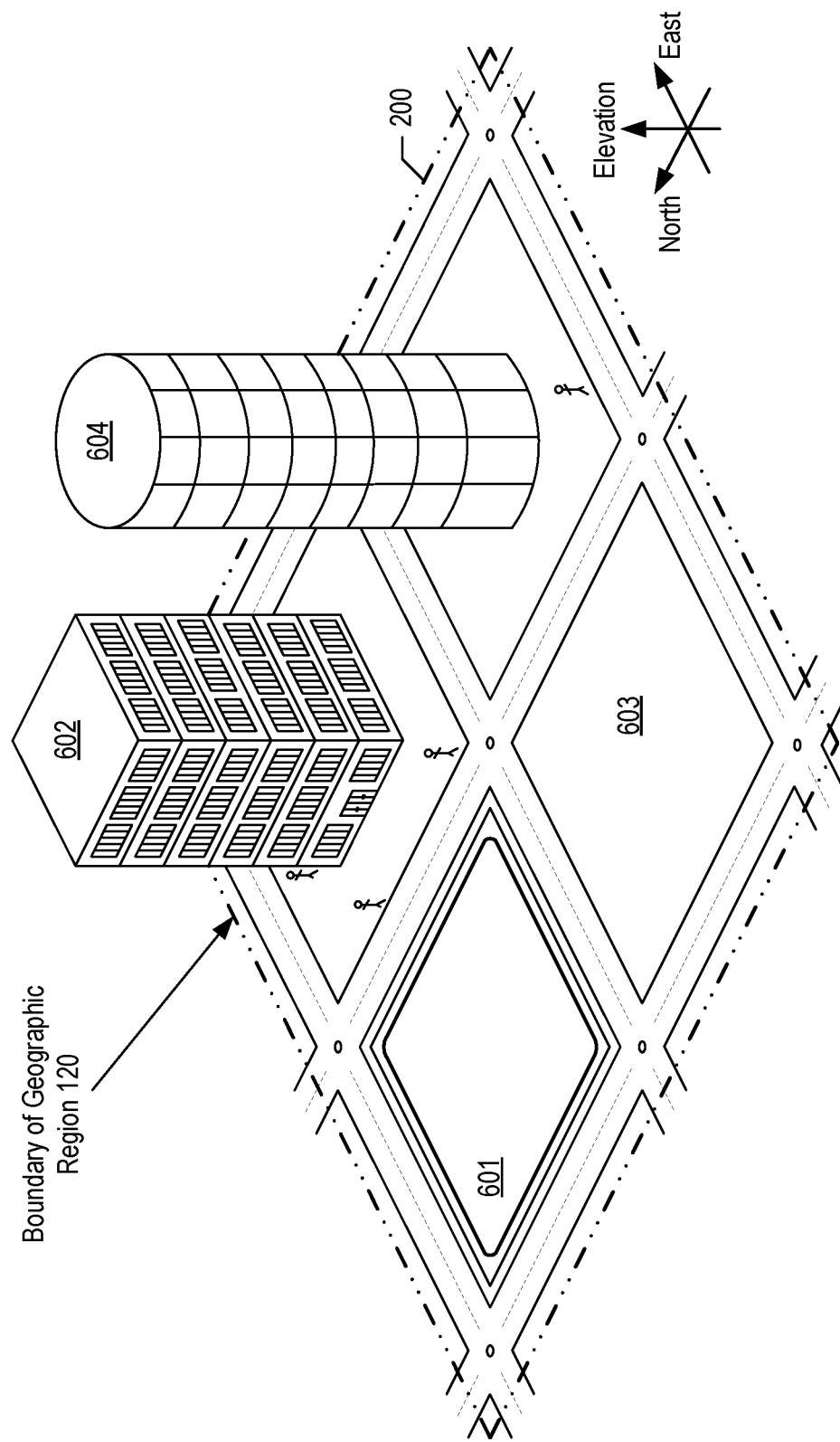
FIG. 6 depicts an isometric drawing of geographic region 120 in accordance with the illustrative embodiment of the present invention.

As part of operation 501, geographic region 120 is delimited and surveyed. FIG. 6 depicts a detailed map that is made of geographic region 120, which spans approximately four city blocks and comprises, among other things, park 601, boxy building 602, empty lot 603, and cylindrical building 604. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
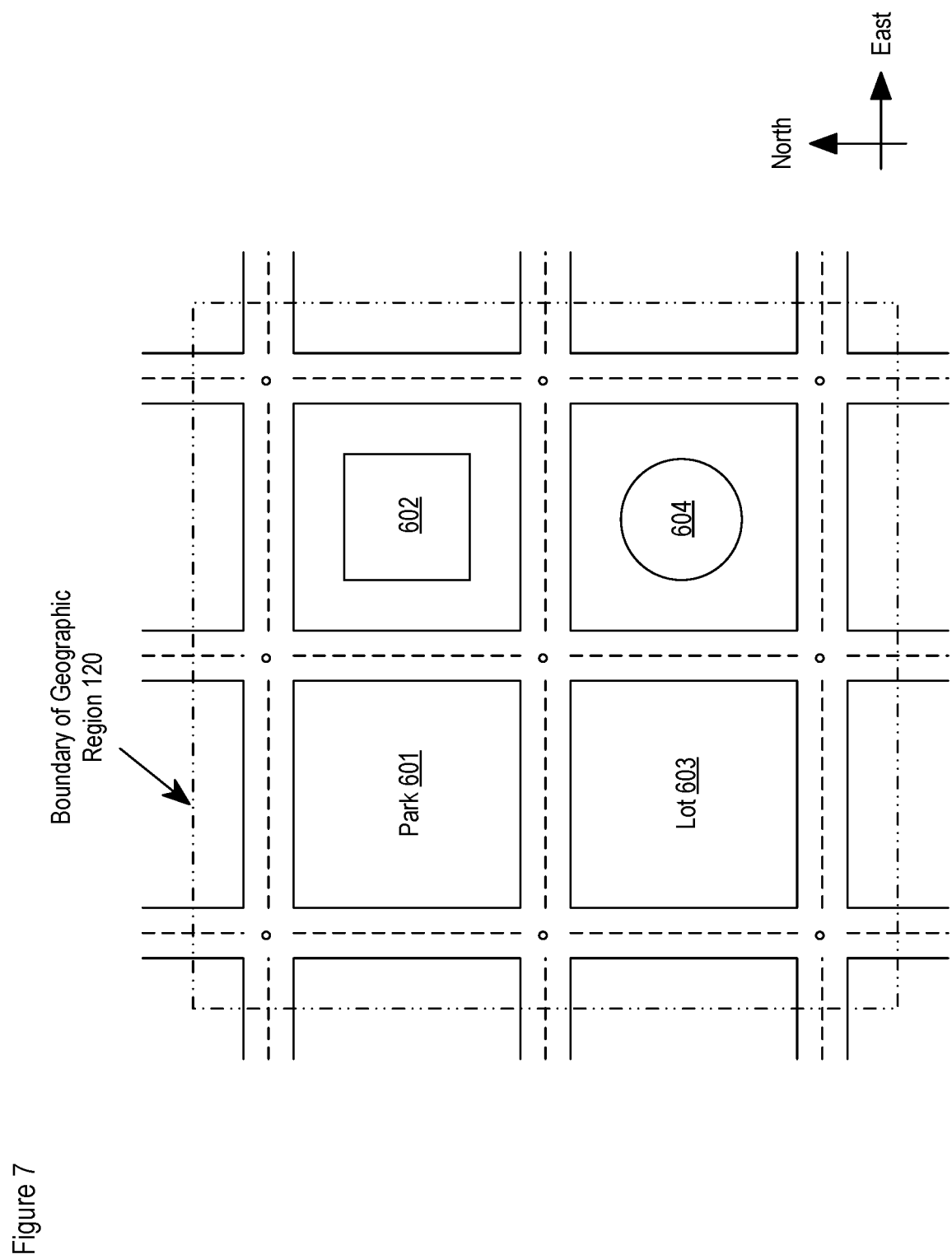
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region is made in well-known fashion, and as shown in FIG. 7.

Figure 8:
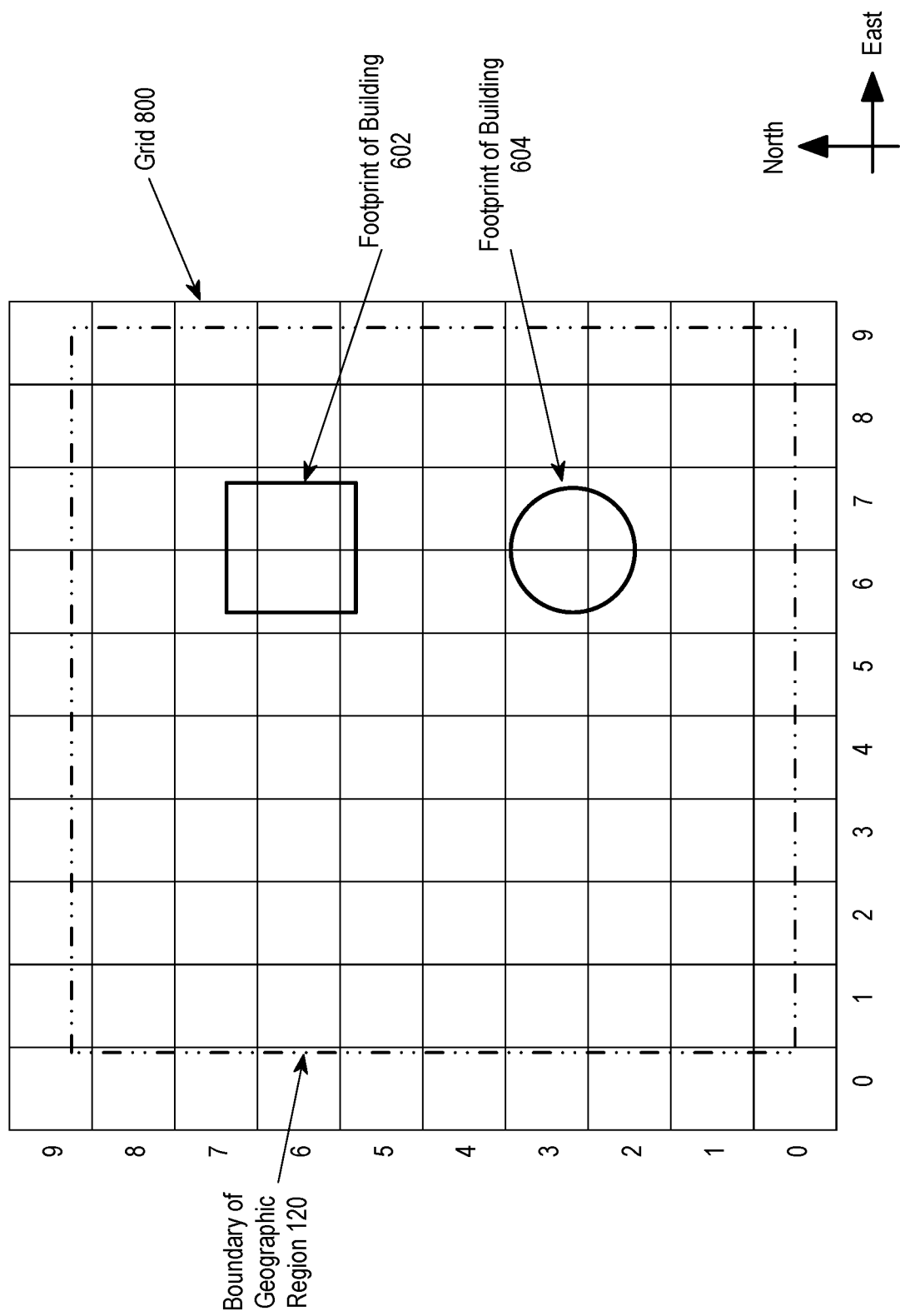
FIG. 8 depicts geographic region 120 divided into a 10-by-10 grid.

As part of operation 501, grid 800 is overlaid onto geographic region 120 as shown in FIG. 8. Grid 800 is a 10-by-10 grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid squares, it will be clear to those skilled in the art how to make and use alternative embodiments of the present invention that comprise any number of possible lateral locations with any shape. See for example and without limitation, U.S. Pat. No. 7,753,278, which is incorporated by reference.

At any instant, the three-dimensional location of wireless terminal 101 can be described by a combination of a lateral location and an elevation. Although it is not improbable for wireless terminal 101 to be at any lateral location in geographic region 120 and it is not improbable for wireless terminal 101 to be at any elevation (up to 1140 meters) above geographic region 120, it is improbable for wireless terminal 101 to be at some combinations of those lateral locations and elevations. For example, it is not improbable for wireless terminal 101 to be at a lateral location in park 601 and to have an elevation of 1001 meters (i.e., be at or near ground level). It is, however, improbable for wireless terminal 101 to be at a lateral location in park 601 and to have an elevation of 1060 meters.

Therefore, as part of operation 501, each improbable combination of lateral locations and elevations for wireless terminal 101 in geographic region is determined, indexed by elevation, and stored in the GIS database. Each improbable combination of lateral locations and elevation for wireless terminal 101 can be determined by referencing the three-dimensional survey of geographic region 120, which is depicted in FIG. 9.

Figure 9:
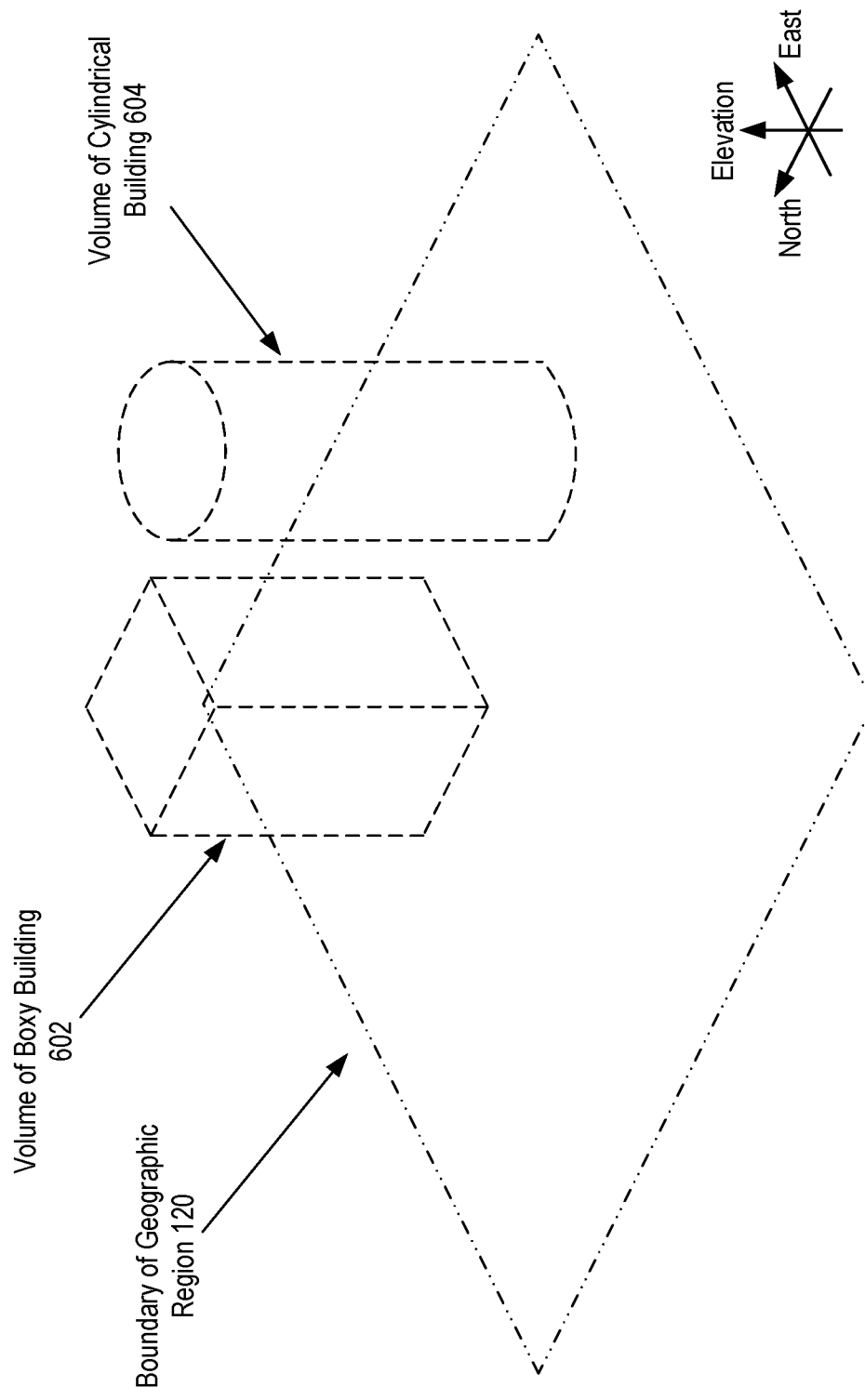
FIG. 9 depicts a three-dimensional survey of geographic region 120.

From the survey (as depicted in FIGS. 8 and 9), it can be seen that when wireless terminal 101 is at ground level (e.g., under an elevation of 1003 meters, etc.), it is not improbable for wireless terminal 101 to be at any lateral location in geographic region 120.

In contrast, when wireless terminal 101 is at an elevation above ground level (e.g., above an elevation of 1003 meters, etc.) and below the rooftop of building 602 (1128 meters), it is improbable for wireless terminal 101 to be at any lateral location that is outside of either boxy building 602 or cylindrical building 604, given the boundaries of the buildings. Therefore, when wireless terminal 101 is in this range of elevations, the plurality of lateral locations of wireless terminal 101 that are not improbable include the following coordinates referenced in FIG. 8: (6,2), (6,3), (6,5), (6,6), (6,7), (7,2), (7,3), (7,5), (7,6), and (7,7).

When wireless terminal 101 is at an elevation above the rooftop of building 602 (1128 meters) and below the rooftop of building 604 (1140 meters), it is improbable for wireless terminal 101 to be at any lateral location that is outside of cylindrical building 604. Therefore, when wireless terminal 101 is in this range of elevations, the plurality of lateral locations of wireless terminal 101 that are not improbable include: (6,5), (6,6), (6,7), (7,5), (7,6), and (7,7).

This information is stored in the GIS database in memory 303 as shown in Table 1.

TABLE 1

Possible Lateral Locations of Wireless Terminal 101 That Are Not Improbable Given The Elevation of Wireless Terminal 101

| Elevation of Wireless Terminal 101 | Possible Lateral Locations of Wireless Terminal 101 That Are Not Improbable |
| --- | --- |
| 1000 to 1003 meters | All 100 Grid Squares |
| 1003 to 1128 meters | (6, 2), (6, 3), (6, 5), (6, 6), (6, 7), (7, 2), (7, 3), (7, 5), (7, 6), (7, 7) |
| 1028 to 1140 meters | (6, 5), (6, 6), (6, 7), (7, 5), (7, 6), (7, 7) |

As described above, buildings 602 and 604 are represented with coordinates. As those who are skilled in the art will appreciate after reading this specification, in some embodiments of the present invention buildings 602 and 604, and objects in general, can be represented in a different way, such as by using a vector-based approach. For example and without limitation, one or more of the buildings in a geographic area can be described by a polygon shape of a building footprint, or rooftop, and the height of the building. Furthermore, any comparisons of distance can be made based on the polygon shape and/or polygon height stored, versus the coordinates stored.

At operation 503, the location-trait database is constructed and stored into memory 303 of location engine 113. As part of operation 503, the identity of—and location-dependent traits for—each radio signal that a wireless terminal (e.g., terminal 101, terminal 102, etc.) is expected to be able to receive from cellular base stations 103-1, 103-2, and 103-3, Wi-Fi base stations 104-1 and 104-2, for each possible lateral location of the wireless terminal, is determined in well-known fashion.

In accordance with the illustrative embodiment, the SSID that a wireless terminal is expected to be able to detect from Wi-Fi base stations 104-1 and 104-2, for each possible location of the wireless terminal, is determined in well-known fashion and stored into the database. Similarly, the MAC address that a wireless terminal is expected to be able to detect from Wi-Fi base stations 104-1 and 104-2, for each possible location of the wireless terminal, is determined in well-known fashion and stored into the database.

As part of operation 503, the identity of—and location-dependent traits for—each radio signal that each of cellular base stations 103-1, 103-2, and 103-3, Wi-Fi base stations 104-1 and 104-2 is expected to be able to receive from a wireless terminal, for each possible lateral location of the wireless terminal, is determined in well-known fashion.

It will be clear to those skilled in the art how to accomplish operation 503, and in accordance with the illustrative embodiment, this is accomplished through a combination of empirical data gathering (e.g., drive testing, crowd sourcing, etc.) and radio-frequency propagation modeling. See for example and without limitation, U.S. Patent Application Publications 2008/0077356, 2008/0077472, and 2008/0077516, which are incorporated by reference.

It will be clear to those skilled in the art that operations 501 and 503 can be performed concurrently or in any order.

Figure 10:
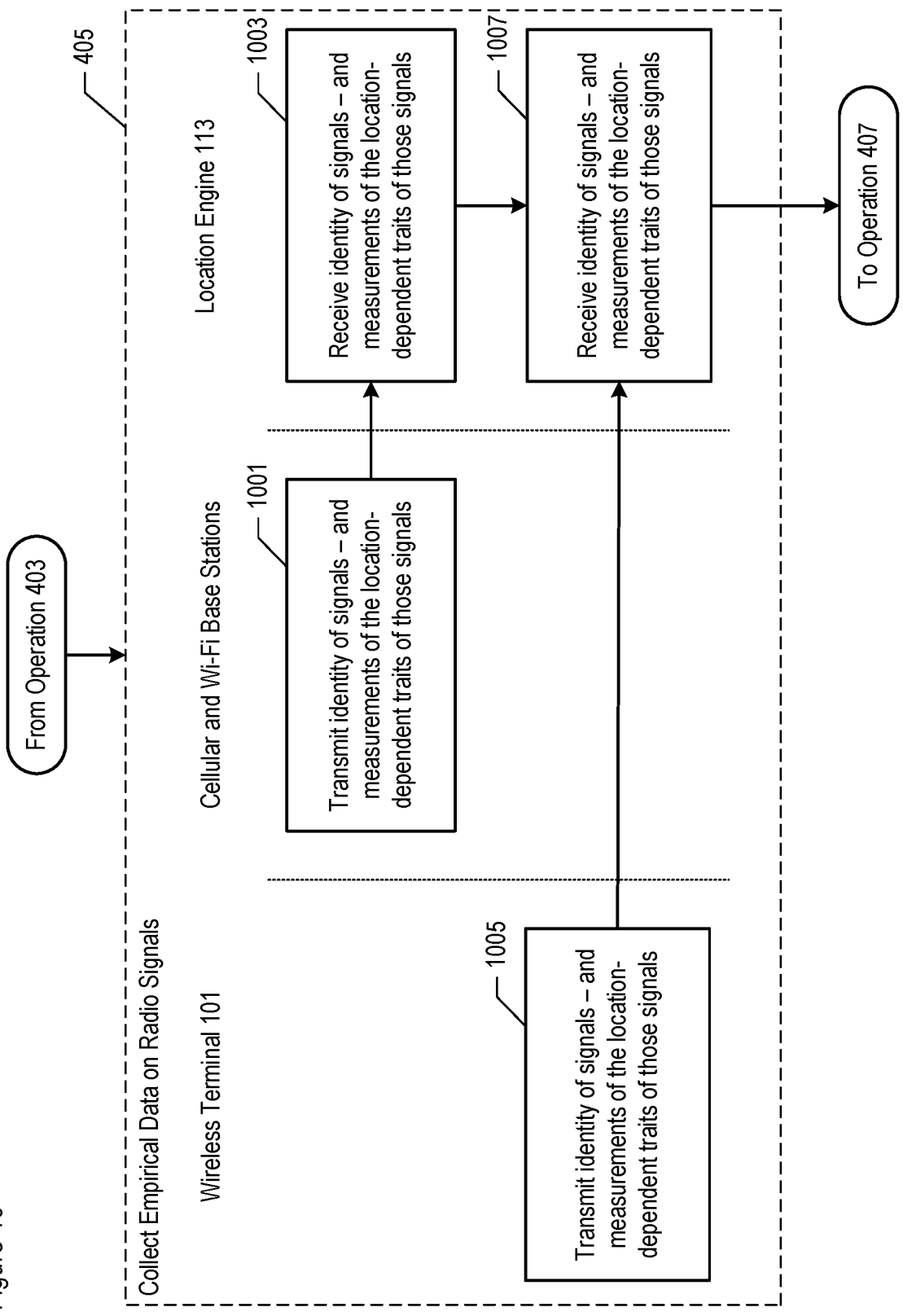
FIG. 10 depicts a flowchart of the salient processes performed in accordance with operation 405 of method 400.

Operation 405: Collect Evidence of Location—FIG. 10 depicts a flowchart of the salient processes performed in accordance with operation 405.

At operation 1001, each of cellular base stations 103-1, 103-2, and 103-3 and Wi-Fi base stations 104-1 and 104-2 transmits the identity of each signal it has received from wireless terminal 101 and the measurements of the location-dependent traits of those signals—though not necessarily simultaneously or synchronously with one another. In accordance with the illustrative embodiment, operation 1001 is performed every 20 milliseconds, but it will be clear to those skilled in the art how to make and use alternative embodiments of the present invention that transmit the measurements at other times.

At operation 1003, location engine 113 receives the identities and measurements transmitted at operation 1001.

At operation 1005, wireless terminal 101 transmits the identity of each signal it receives from cellular base stations 103-1, 103-2, and 103-3 and Wi-Fi base stations 104-1 and 104-2 and the measurements of the location-dependent traits of those signals. In accordance with the illustrative embodiment, operation 1005 is performed every 20 milliseconds, but it will be clear to those skilled in the art how to make and use alternative embodiments of the present invention that transmit the measurements at other times.

At operation 1007, location engine 113 receives the identities and measurements transmitted at operation 1005.

Operations 1001 through 1007 are performed continuously, concurrently, and asynchronously, in accordance with the illustrative embodiment.

In some embodiments of the present invention, the evidence of location that is collected can also include barometric pressure measurements made by wireless terminals 101 and 102. It will be clear to those skilled in the art how to make and use embodiments of the present invention to perform operation 405, including the collecting of barometric pressure measurements. See for example and without limitation, U.S. Pat. Nos. 9,432,811 and 9,237,423, which are incorporated by reference herein.

Figure 11:
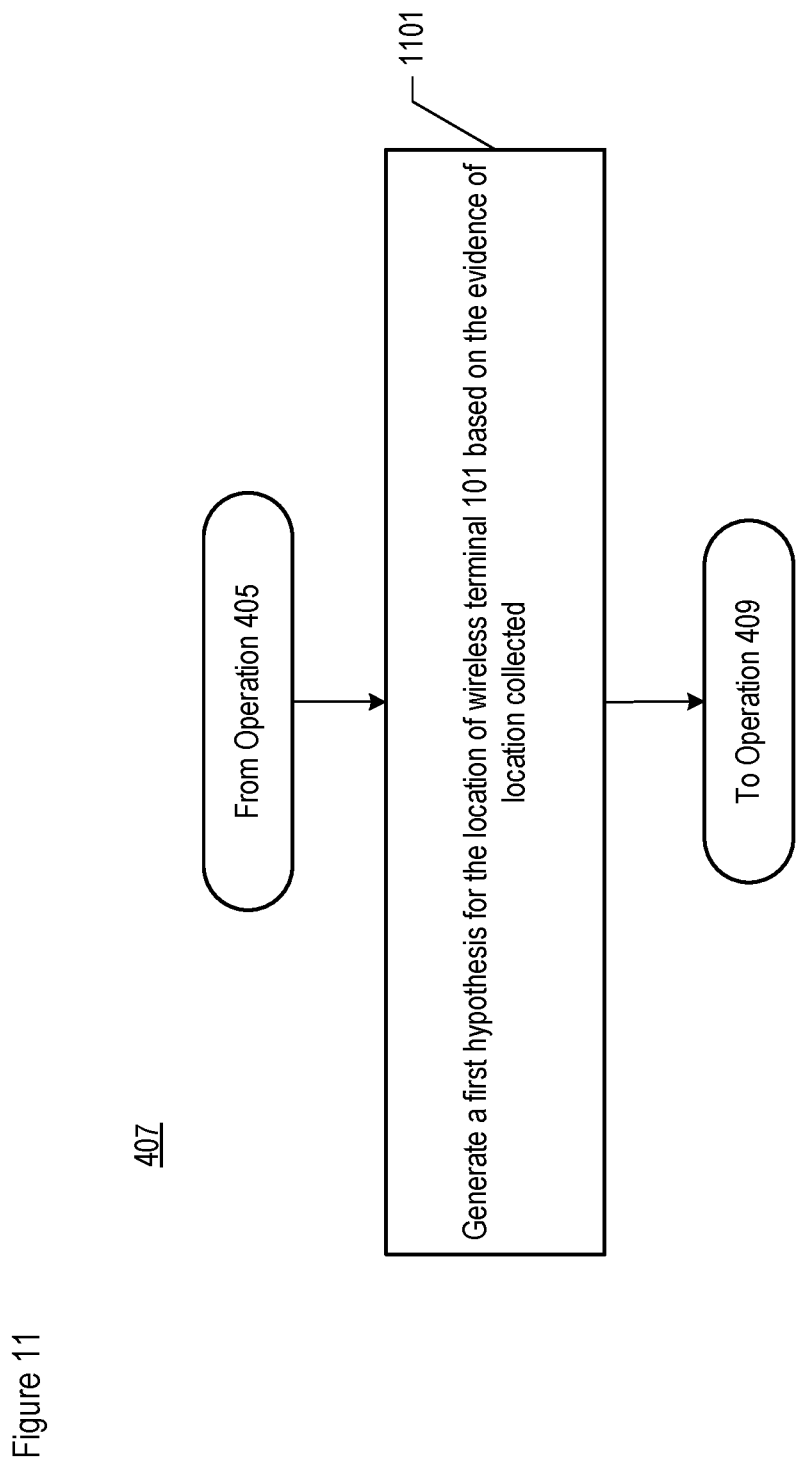
FIG. 11 depicts a flowchart of the salient processes performed in accordance with operation 407 of method 400.

Operation 407: Generate a First Hypothesis for the Location—FIG. 11 depicts a flowchart of the salient processes performed in accordance with operation 407.

In accordance with operation 1101, location engine 113 generates a first hypothesis for the location of wireless terminal 101 based on:
  (i) the location-dependent information conveyed by a radio signal exchanged between a base station (e.g., cellular base station **103-*i*, Wi-Fi base station 104-*j*, etc.) and wireless terminal 101 (e.g., the empirical data for the radio signals received in operation 405**, etc.), and
  (ii) the location-trait database,
in well-known fashion. It will be clear to those skilled in the art how to make and use embodiments of the present invention to perform operation 407. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference. In accordance with the illustrative embodiment of the present invention, the estimate of the lateral location of wireless terminal 101 is one grid square in geographic region 120 (as depicted in FIG. 8).

In some embodiments of the present invention, the first hypothesis for the location of wireless terminal 101 can also include an estimate of elevation. It will be clear to those skilled in the art how to make and use embodiments of the present invention to perform operation 407, including the estimating of elevation. See for example and without limitation, U.S. Pat. Nos. 9,432,811 and 9,237,423, which are incorporated by reference herein. The estimating of elevation can be based on barometric pressure measurements described above and in regard to operation 405.

As those who are skilled in the art will appreciate after reading this specification, in some alternative embodiments the location can be determined using a different technique than the radio frequency (RF) pattern matching described above and that is based on a measurement of a location-dependent trait of a radio signal and/or on the identity of a radio signal. The generating of the first hypothesis can be based on pattern matching, Global Navigation Satellite System [GNSS], GPS, multilateration such as time-difference of arrival (TDOA), cell ID, enhanced cell ID (E-CID), and so on, for example and without limitation. In at least some embodiments of the present invention, the generating of the first hypothesis excludes any consideration of any SSID or MAC address that is used for generating, as described below, the second and third hypothesis, respectively.

The first hypothesis for the location of wireless terminal 101 can be conceptualized as a first probability map, or probability surface, that represents the probability of the wireless terminal being at a particular point in space as a function of one or more spatial dimensions, based on the evidence of location.

Figure 12:
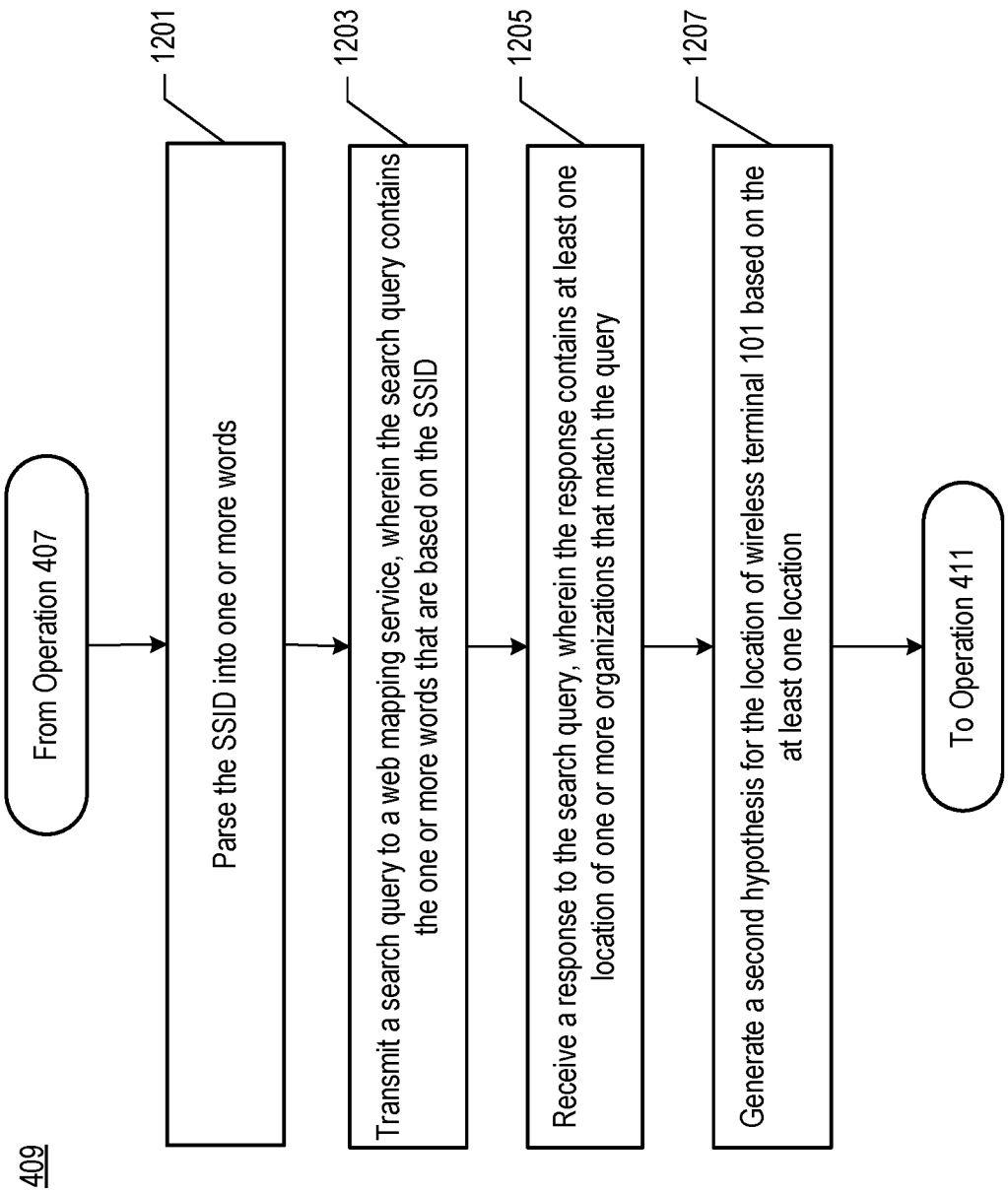
FIG. 12 depicts a flowchart of the salient processes performed in accordance with operation 409 of method 400.

Operation 409: Generate a Second Hypothesis for the Location—FIG. 12 depicts a flowchart of the salient processes performed in accordance with operation 409.

At operation 1201, location engine 113 parses the SSID received from wireless terminal 101 in accordance with operation 403, resulting in a first parsed SSID of one or more words. For example and without limitation, parsing the SSID can result in the removal of one or more characters (e.g., non-alphanumeric characters, punctuation, underscores, underlines, hyphens, dashes, etc.) from the SSID, resulting in the first parsed SSID. If the received SSID is "Hilton-Public_02", for example, the first parsed SSID might be "Hilton Public 02" and consists of three words (i.e., "Hilton", "Public", and "02"). If multiple SSIDs are received from wireless terminal 101, location engine 113 can use the SSID or SSIDs corresponding to the N strongest signals reported by the wireless terminal, wherein N is a positive integer, parsing each SSID as described above.

At operation 1203, location engine 113 transmits a search query to a web mapping service, wherein the search query contains one or more words that are based on the first parsed SSID. "Web mapping" refers to the process of using one or more maps delivered by GIS sources. A service that features web mapping can be GOOGLE MAPS, APPLE MAPS, BING MAPS, MAPQUEST, OPENSTREETMAP, and WAZE, for example and without limitation. For example, if the first parsed SSID is "Hilton Public 02", the search query sent to one such web mapping service might contain any combination of one or more of the words "Hilton", "Public", and "02". In some embodiments of the present invention, location engine 113 transmits a message to, and in other ways interacts with, a database (e.g., private database, public database, etc.), instead of or in addition to transmitting a search query to a web mapping service; the message contains the one or more words that are based on the first parsed SSID.

In some embodiments of the present invention, location engine 113 can transmit more than one search query, wherein each query contains a different subset of the words in the first parsed SSID, including proper subsets. Location engine 113 can also transmit more than one search query based on more than one parsed SSID. In some embodiments of the present invention, each search query can contain the unparsed SSID, instead of or in addition to a parsed SSID. In some embodiments, location engine 113 transmits the search query or queries to a web search engine that is not a web mapping service.

In some embodiments of the present invention, location engine 113 transmits a search query that also contains some additional context. For example, the search query can also contain further search requirements (e.g., "near me, "near «specific location»", etc.). If specified in the search query, a specific location can be derived from the first hypothesis of location generated in operation 407, can be derived from the evidence of location directly, or can be derived from yet another source or hypothesis of location that is independent of the first hypothesis.

At operation 1205, location engine 113 receives a response to the search query, for each search query transmitted. In some embodiments of the present invention, the response contains one or more "hits," which are instances of identifying an item of data that matches the requirements of a search. For example, if a search query contains the word "Hilton" or a related name, as derived from the SSID, the response might contain one or more Hilton Hotels & Resorts® locations.

The response to the search query can contain at least one location of one or more organizations that match the query, wherein an organization in this context is an organized body of people with a particular purpose (e.g., a business, society, etc.). In some embodiments of the present invention, the response further contains a geographical mapping of the one or more locations of the one or more businesses. In some embodiments of the present invention, location engine 113 filters out any hits that are not related to an organization.

At operation 1207, location engine 113 generates a second hypothesis for the location of wireless terminal 101 based on the at least one location contained in the received response. The second hypothesis for the location of wireless terminal 101 can be conceptualized as a second probability map that represents the probability of the wireless terminal being at a particular point in space as a function of one or more spatial dimensions, based on one or more of the responses received at operation 1205. For example, the probability might be i) set to a high value (e.g., 100%, 80%, etc.) for any spatial point corresponding to and existing within a Hilton location received in the response and ii) set to a low value (e.g., zero, 20%, etc.) for any spatial point outside of the Hilton location. In one variation, an SSID name-based location probability, in which a search query is based on the word "Hilton", might graphically resemble a hill or a cube, wherein non-zero values on the z-axis correspond to one or more Hilton locations across an x-y coordinate plane and zero values on the z-axis correspond to everywhere outside of the Hilton location or locations.

Figure 13:
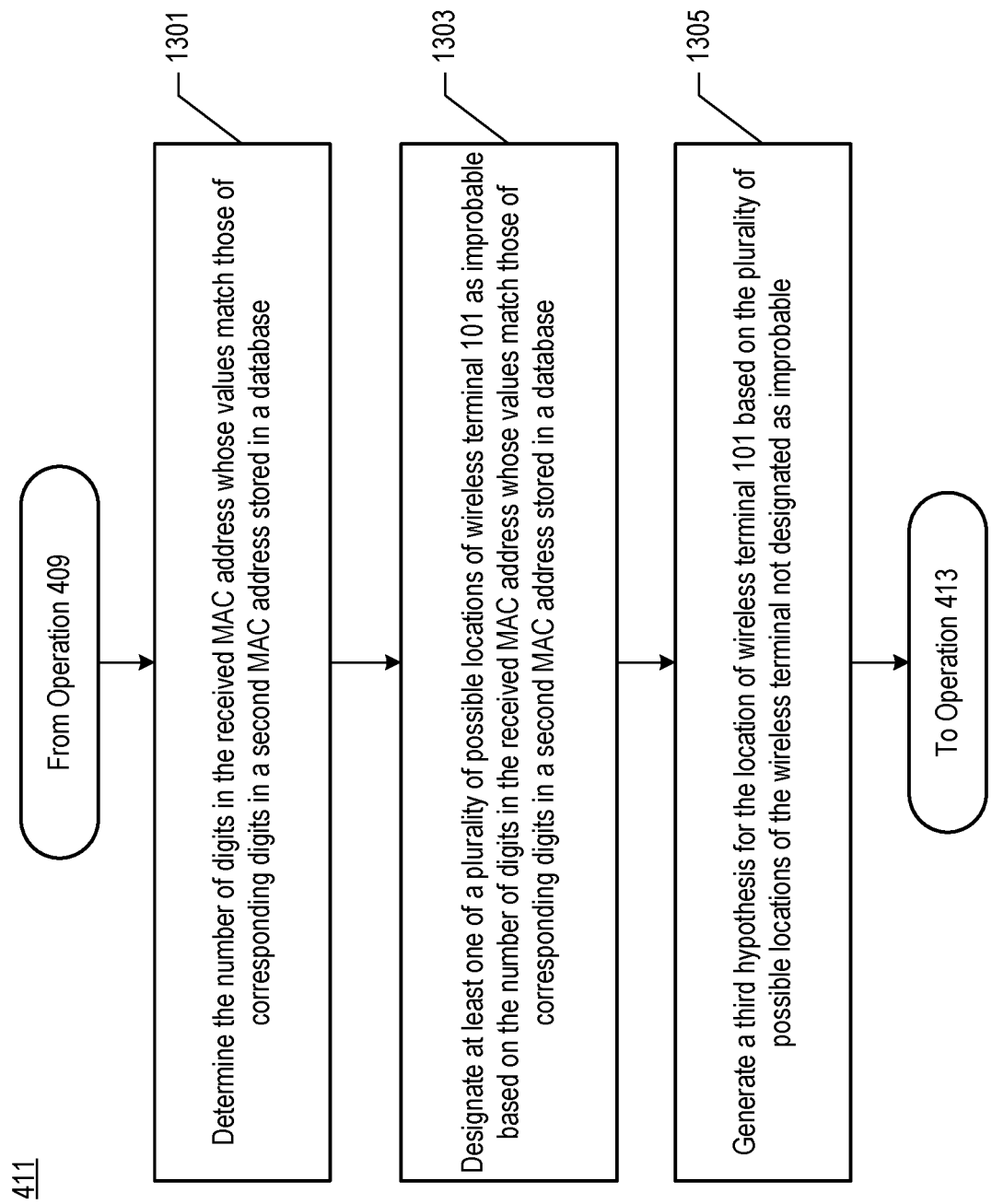
FIG. 13 depicts a flowchart of the salient processes performed in accordance with operation 411 of method 400.

Operation 411: Generate a Third Hypothesis for the Location—FIG. 13 depicts a flowchart of the salient processes performed in accordance with operation 411.

At operation 1301, location engine 113 determines whether there is either an exact match or a close, but not exact, match—hereinafter, a "close-enough match"—between i) the MAC address received from wireless terminal 101 in accordance with operation 403 and ii) one or more MAC addresses stored in the database constructed in accordance with operation 503. An exact match suggests that wireless terminal 101 is located in the coverage area of the access point identified by the MAC address it is transmitting.

In regard to a close-enough match, however, the rationale for determining whether there is a close-enough match is that in a given building or section of building having a single business, the MAC addresses of many, if not all, of the access points are identical except for some of the least significant digits (e.g., the last two digits, etc.). This can be explained by the fact that the business purchased most or all of the access points at the same time and in the same lot, wherein the access point manufacture had assigned the MAC addresses in sequential order.

Each MAC address stored in the database is associated with a known location, as described above and in regard to operation 503. For example, the survey performed in accordance with operation 503 might have been done at ground level only, in which only MAC addresses of access points at the lowest level or levels in a building were detected and stored into the database.

If a received MAC address is a close-enough match with a stored MAC address associated with particular building or facility, then it can be inferred that the access point of the received MAC address is probably at a location within the same building or facility. For example, the received MAC address "(1A:F3:34:88:CB:12)" might be that of an access point located at an upper level in the building, while the stored MAC address "(1A:F3:34:88:CA:A8)" is from a survey that was performed only at ground level. If multiple MAC addresses are received from wireless terminal 101, location engine 113 can use the MAC address corresponding to the strongest signal reported by the wireless terminal.

As those who are skilled in the art will appreciate after reading this specification, any of a variety of ways can be used in order to determine whether there is a close-enough match. In accordance with the illustrative embodiment, location engine 113 determines the number of digits in the received MAC address whose values match those of corresponding digits in a second MAC address stored in a database. In accordance with the illustrative embodiment, location engine 113 determines the number of digits starting with the most significant digit and stopping with the first non-matching digit. In this way, location engine 113 determines that there is a close-enough match if the number of matching digits exceeds a predefined threshold, with an emphasis on having an exact match between the more significant digits.

In some embodiments of the present invention, upon determining that there is a close-enough match, location engine 113 stores the received MAC address in the database and associates it with a known and relatively specific location (e.g., within a particular building instead of merely on the street, etc.), although at possibly a lower confidence level than the MAC addresses stored in accordance with operation 503. In this way, a future iteration of operation 1301 may check for match between a received MAC address and the newly-stored MAC address and treat a close-enough match involving said MAC address as having a lower confidence, or not, for the purpose of handling a third hypothesis of location described below (e.g., by assigning a lesser weight to the hypothesis, etc.).

In some other embodiments of the present invention, determining whether there is a close-enough match amongst MAC addresses further comprises location engine 113 determining whether there is a close-enough match amongst SSID names as well. The unique combination of similar SSID names and MAC addresses having identical first N digits, from most- to least-significant (e.g., N being equal to 8, etc.), can increase the confidence level, compared with matching MAC addresses only. For example, an SSID of "Hilton-Public_02" and a MAC address of "(1A:F3:34:88:CA:A8)" are already stored in the database in accordance with operation 503; when location engine 113 receives an SSID of "Hilton-Public_23" and a MAC address of "(1A:F3:34:88:CB:12)", the reporting wireless terminal can be inferred to be within the same building, with higher confidence than had only the MAC addresses been compared.

At operation 1303, location engine 113 designates at least one of a plurality of possible locations of the wireless terminal as improbable based on determining that the received MAC address is a close enough match with the second MAC address stored in the database. For example, location engine 113 can designate as improbable all locations outside the building or facility in which the access point identified by the second MAC address is located; conversely, the location engine can designate as probable all locations within said building or facility.

In some embodiments of the present invention, location engine 113 designates at least one of a plurality of possible locations of the wireless terminal as improbable based on determining that an SSID received in accordance with operation 403 is a close enough match with a second SSID stored in the database. Location engine 113 can do so in addition to, or instead of, designating based on the MAC address. For example, location engine 113 can designate as improbable all locations outside the building or facility in which the WLAN identified by the second SSID is located; conversely, the location engine can designate as probable all locations within said building or facility. As other examples, location engine 113 can designate locations as improbable, or as probable, based on any combination of MAC address matches and SSID matches.

At operation 1305, location engine 113 generates a third hypothesis for the location of the wireless terminal based on the plurality of possible locations of the wireless terminal not designated as improbable. The third hypothesis for the location of wireless terminal 101 can be conceptualized as a third probability map that represents the probability of the wireless terminal being at a particular point in space as a function of one or more spatial dimensions, based on one or more of the responses received at operation 1205. For example, the probability might be set to a high value (e.g., 100%, 80%, etc.) for any spatial point designated as probable and set to a low value (e.g., zero, 20%, etc.) for any spatial point designated as improbable.

In some embodiments of the present invention, location engine 113 generates, and subsequently uses, the third hypothesis only if there is not an exact match for any MAC address reported by wireless terminal 101.

Figure 14:
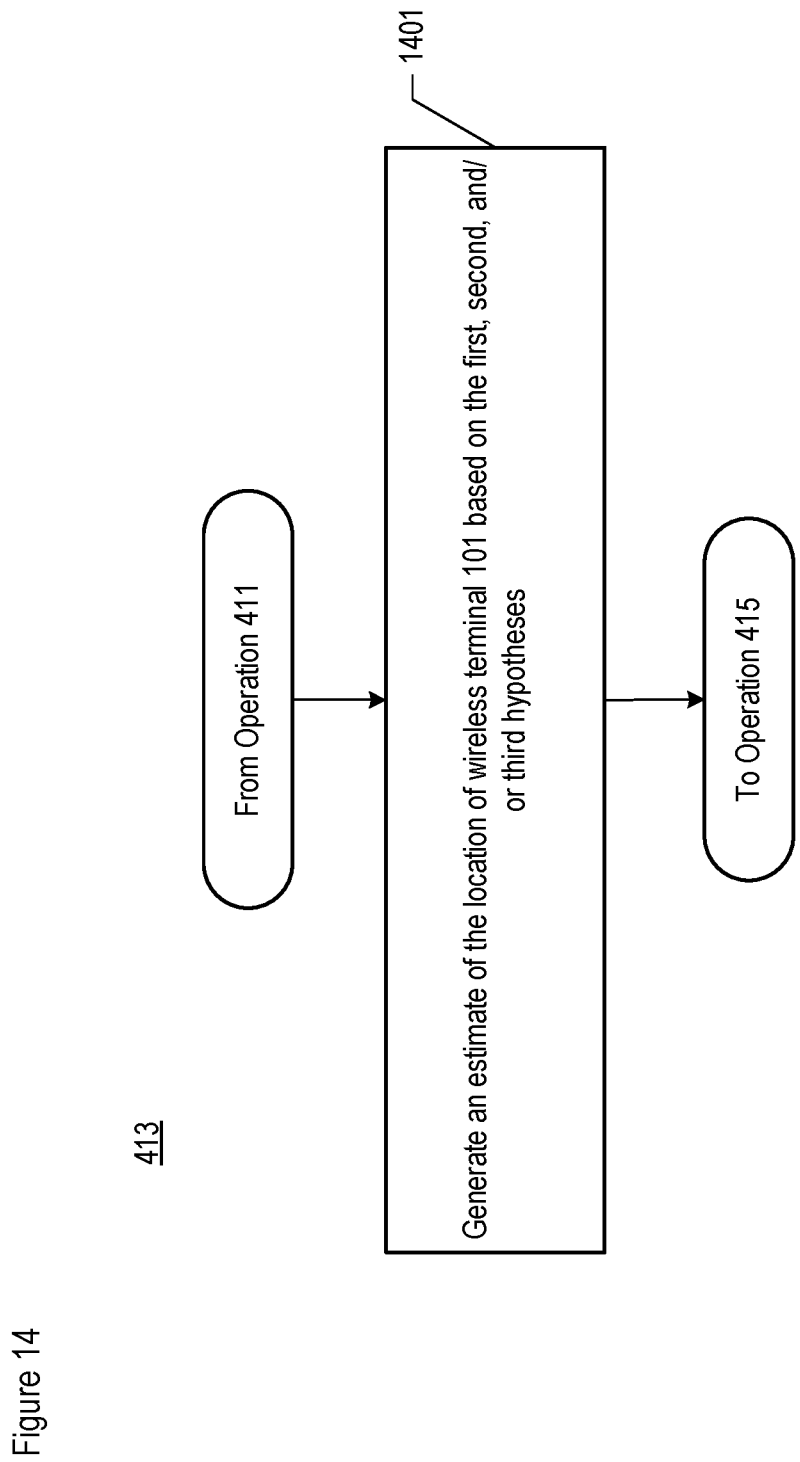
FIG. 14 depicts a flowchart of the salient processes performed in accordance with operation 413 of method 400.

Operation 413: Generate an Estimate of Location—FIG. 14 depicts a flowchart of the salient processes performed in accordance with operation 413.

At operation 1401, generates the estimate for the location of wireless terminal 101, by combining at least two of the first, second, and third hypotheses (obtained in accordance with operations 407, 409, and 411 respectively) with one other, wherein each of the hypotheses is given non-zero weight in the combining process. Conceptually, the respective first, second, and third probability maps can be combined with one another in well-known fashion, wherein the estimate of location is based on one or more locations whose probability values taken from the combined probability map exceed a predefined threshold (e.g., 95%, 90%, 80%, etc.). As those who are skilled in the art will appreciate after reading this specification, a different technique of combining the hypotheses can be used. In some embodiments of the present invention, the different hypotheses can be assigned different weights.

In some embodiments of the present invention, the first hypothesis can be regarded as an initial hypothesis and each of the second and third hypotheses can be regarded as an alternative hypothesis.

In some embodiments of the present invention, location engine 113 can base the estimate of location on multiple sets of hypotheses across multiple times (t[1], t[2], t[3], etc.) within a given time interval. Location engine 113 can do so by determining which combination of hypotheses (e.g., first and second hypotheses, first and third hypotheses, etc.) is the most self-consistent during the entire time interval. The self-consistency of a given combination of hypotheses can be measured in terms of the range, variance, and/or standard deviation of the estimates of location across the multiple times for that combination of hypotheses.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal, the method comprising:
   receiving, by a data-processing system:
      a service set identifier (SSID) associated with a wireless network and reported by the wireless terminal;
   transmitting, by the data-processing system, a search query to a web mapping service, wherein the search query contains one or more words that are based on the SSID;
   receiving, by the data-processing system, a response to the search query, wherein the response contains at least one location of one or more organizations that match the query;
   generating, by the data-processing system, a first hypothesis for the location of the wireless terminal based on the at least one location of the one or more organizations; and
   generating, by the data-processing system, an estimate of location of the wireless terminal based on the first hypothesis.

2. The method of claim 1 further comprising transmitting the estimate of location of the wireless terminal to a location-based application server.

3. The method of claim 1 further comprising parsing the SSID before the transmitting of the query occurs, into the one or more words.

4. The method of claim 1, further comprising:
   receiving, by the data-processing system, evidence of the location of the wireless terminal, wherein the evidence is independent of the wireless network; and
   generating, by the data-processing system, a second hypothesis for the location of the wireless terminal based on the evidence of the location;
   wherein the search query further contains a search requirement that is based on the second hypothesis for the location of the wireless terminal.

5. The method of claim 4 wherein the evidence of the location of the wireless terminal comprises a signal-strength measurement.

6. The method of claim 4 wherein the evidence of the location of the wireless terminal comprises a time measurement.

7. The method of claim 4 wherein the evidence of the location of the wireless terminal comprises a media access control (MAC) address.

8. A method of estimating the location of a wireless terminal, the method comprising:
   receiving, by a data-processing system:
      a first media access control (MAC) address associated with a wireless network and reported by the wireless terminal;
   designating at least one of a plurality of possible locations of the wireless terminal as improbable based on:
      i) the number of digits in the first MAC address whose values match those of corresponding digits in a second MAC address stored in a database;
   generating, by the data-processing system, a first hypothesis for the location of the wireless terminal based on the plurality of possible locations of the wireless terminal not designated as improbable; and
   generating, by the data-processing system, an estimate of location of the wireless terminal based on the first hypothesis.

9. The method of claim 8 further comprising transmitting the estimate of location of the wireless terminal to a location-based application server.

10. The method of claim 8 further comprising determining the number of digits in the first MAC address whose values match those of corresponding digits in a second MAC address stored in a database, starting with the most significant digit and stopping with the first non-matching digit.

11. The method of claim 8, wherein there exists at least one non-matching digit between the first and second MAC addresses.

12. The method of claim 8 wherein the estimate of the location of the wireless terminal is further based on a signal-strength measurement.

13. The method of claim 8 wherein the estimate of the location of the wireless terminal is further based on a time measurement.

14. The method of claim 8 wherein the estimate of the location of the wireless terminal is further based on a service set identifier (SSID) reported by the wireless terminal.

15. A method of estimating the location of a wireless terminal, the method comprising:
   receiving, by a data-processing system:
      i) a service set identifier (SSID) associated with a wireless network and reported by the wireless terminal, and
      ii) a first media access control (MAC) address associated with the wireless network and reported by the wireless terminal;
   parsing the SSID, resulting in a first parsed SSID of one or more words;
   designating at least one of a plurality of possible locations of the wireless terminal as improbable based on:
      i) the number of words in the first parsed SSID that match those of a second parsed SSID stored in a database, and
      ii) the number of digits in the first MAC address whose values match those of corresponding digits in a second MAC address stored in the database;
   generating, by the data-processing system, a first hypothesis for the location of the wireless terminal based on the plurality of possible locations of the wireless terminal not designated as improbable; and
   generating, by the data-processing system, an estimate of location of the wireless terminal based on the first hypothesis.

16. The method of claim 15 further comprising transmitting the estimate of location of the wireless terminal to a location-based application server.

17. The method of claim 15 further comprising determining the number of digits in the first MAC address whose values match those of corresponding digits in a second MAC address stored in a database, starting with the most significant digit and stopping with the first non-matching digit.

18. The method of claim 15, wherein there exists at least one non-matching digit between the first and second MAC addresses.

19. The method of claim 15 wherein the estimate of the location of the wireless terminal is further based on a signal-strength measurement.

20. The method of claim 15 wherein the estimate of the location of the wireless terminal is further based on a time measurement.

\* \* \* \* \*